Oct. 19, 1937.   A. R. MOELLER   2,096,190
COMBINED GEAR SHIFT BALL AND LIGHT SIGNAL
Filed March 30, 1936
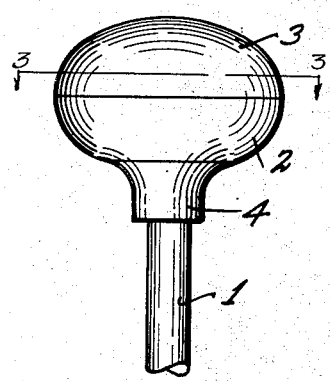
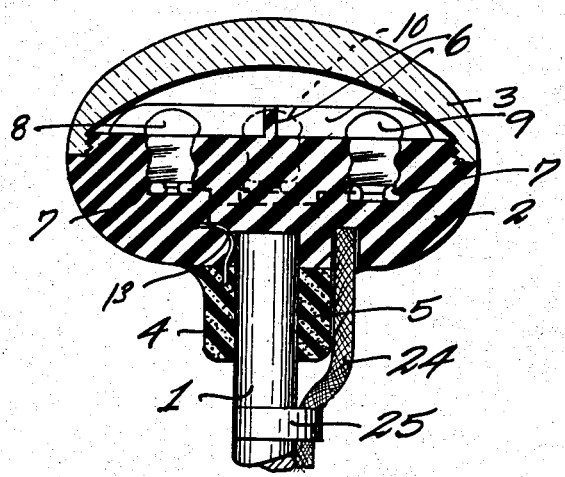
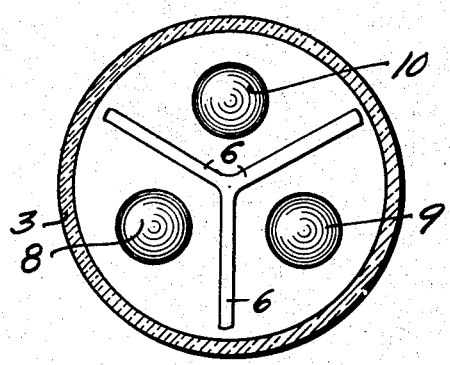
INVENTOR.
Albert R. Moeller
BY
ATTORNEY.

Patented Oct. 19, 1937

2,096,190

UNITED STATES PATENT OFFICE 2,096,190

COMBINED GEAR SHIFT BALL AND LIGHT SIGNAL

Albert R. Moeller, Spokane, Wash.

Application March 30, 1936, Serial No. 71,554

2 Claims. (Cl. 177—311)

This invention relates to a device which serves not only as an illuminated gear shift ball but also as a signal by means of which the illumination of the headlights and the parking lights may be indicated to the driver of an automobile.

One object of the invention is to so form the device that it may be easily applied to a gear shift lever of a conventional formation and have its upper portion illuminated so that when driving at night the lever may be easily located and quickly grasped when it is desired to shift gears.

Another object of the invention is to so arrange the bulbs in the ball or knob that by observing which bulbs are illuminated, it can be accurately determined whether the parking lights are burning and also whether the bright or dim filaments of the headlights are in use.

Another object of the invention is to so form the gear shift knob or ball that it may have the signaling bulbs mounted therein without increasing its dimensions beyond those of a knob or ball usually used upon a gear shift lever.

The invention is illustrated in the accompanying drawing wherein:

Figure 1 is a side elevation of the improved ball.

Figure 2 is a sectional view taken vertically through the ball.

Figure 3 is a sectional view taken horizontally through the ball along line 3—3 of Figure 1.

The knob or ball is to be applied to the upper end of a gear shift lever 1 of an automobile in place of the ball usually provided and has a lower section or body 2 and an upper section or cover 3 which is formed of transparent or translucent material and has threaded engagement with the body so that it can be removed when necessary. By referring to Figure 2, it will be seen that the cover is arcuate in cross section to dispose it in spaced relation to the upper face of the body and thus form a chamber within the knob when the cover is in place. The body is formed of insulating material such as hard rubber and at its lower end is provided with a depending centrally located neck 4 of soft rubber formed with a socket 5 which is normally of somewhat less diameter than the lever so that when the upper portion of the lever is forced into the socket a frictional gripping action will take place and hold the knob in position. Ribs 6 project upwardly from the flat upper face of the body and diverge from the center thereof as shown in Figure 3, so that the upper face of the body will be divided into three arcuate sections of equal dimensions. At the center of each section of the body, a socket or shell 7 is embedded in the body to receive an electric bulb, the bulbs being individually indicated by the numerals 8, 9 and 10 as they are of contrasting colors such as a blue bulb 8, a green bulb 9 and a red bulb 10, and serve as signals to indicate the condition of the headlights and the parking lights as well as to illuminate the knob and permit the operator of the automoible to easily locate the gear shift lever when driving at night. Center terminals of the socket 7 are grounded to the gear shift lever by the wire 12, which extends into the lever receiving socket, as shown in Figure 2. Since the neck having the lever receiving socket therein is formed of soft rubber which grips the lever, a good contact will be assured between the wire 12 and the lever and a good ground established. The bulbs will be mounted in a conventional illuminating circuit wherein the bulbs are provided with a common ground wire 12 and each has cooperating relation to a companion bulb of the parking light or headlight.

I have, therefore, provided an improved knob which may be easily applied to a gear shift lever in lieu of the one initially provided and so constructed that it will not only be illuminated and easy to locate, but also serve as a signal to indicate whether the parking lights are burning or whether the headlights are burning bright or dimmed.

Having thus described the invention, what is claimed is;

1. A gear shift lever knob comprising a body of hard insulating material having a depending neck of elastic material, the neck being formed with a socket to receive the upper portion of a lever and frictionally grip the lever, bulb receiving sockets carried by the body of hard insulating material and having a ground wire entering the socket of the neck in position for engaging a lever about which the elastic neck fits, and a top of light penetrable material detachably carried by said body and adapted to enclose bulbs carried by the bulb receiving sockets.

2. A gear shift lever knob comprising a body formed of hard insulating material and having a depending hollow neck of elastic material open at its lower end and adapted to fit about and grip a gear shift lever, bulb receiving sockets embedded in the upper face of the body of hard insulating material, ribs rising from the upper face of the body between said sockets, and a cap of light penetrable material detachably applied to the body over the same in enclosing relation to the bulb receiving sockets, the cap being arcuate upwardly in cross section to provide a bulb receiving chamber between the body and the cap.

ALBERT R. MOELLER.